Dec. 20, 1938.   G. M. ARRAGG   2,140,613
OILING DEVICE FOR DEAD SPINDLES
Filed Nov. 22, 1937   2 Sheets-Sheet 1
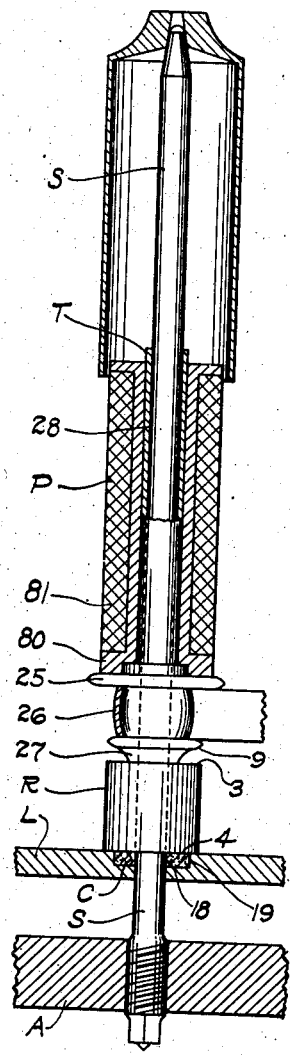
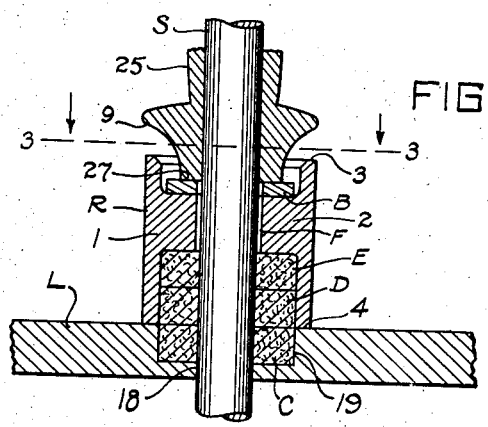
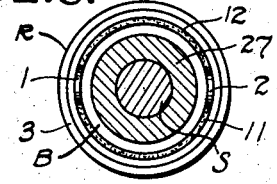
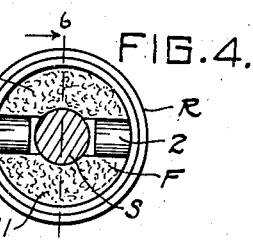
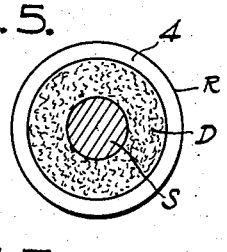
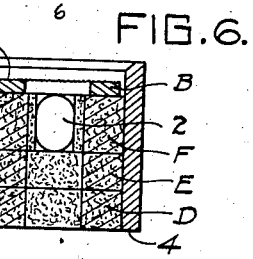
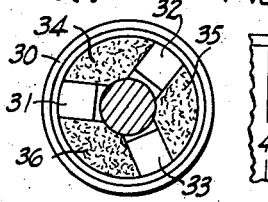
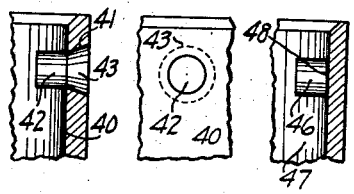
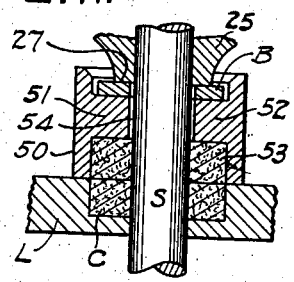
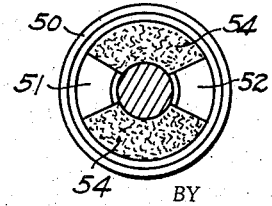
INVENTOR.
George M. Arragg
BY Gardner W. Passon
ATTORNEY.

Dec. 20, 1938.   G. M. ARRAGG   2,140,613
OILING DEVICE FOR DEAD SPINDLES
Filed Nov. 22, 1937    2 Sheets-Sheet 2

INVENTOR.
George M. Arragg
BY
Gardner W. Pearson
ATTORNEY.

Patented Dec. 20, 1938

2,140,613

UNITED STATES PATENT OFFICE 2,140,613

OILING DEVICE FOR DEAD SPINDLES

George M. Arragg, Lawrence, Mass.

Application November 22, 1937, Serial No. 175,753

3 Claims. (Cl. 308—169)

This invention relates to oiling devices for spinning machines of the dead spindle type as distinguished from those in which the spindle itself revolves. It applies to cap frames and ring frames and the term "spinning machines" is intended to include twisting machines and other similar devices for revolving a strand of textile fibres to produce a twist in it.

The device applies to machines in which there is a row of vertical cylindrical spindles which are fixed at their bottom to a stationary rail. There are approximately one hundred spindles on each side and for each spindle there may be a cap or there may be a ring, but in either case, there is a lifter rail which causes to move up and down a tube slidable on each spindle. Each tube is revoluble by means of a whirl at the bottom, each whirl being revolved by a band in a well-known way. Each spindle passes through a hole in the lifter rail and there is usually a recess surrounding this hole in which an absorbent washer is placed. Extending over the recess is a metal washer on which the bottom or base of the tube and of the whirl rests. The base is intended to revolve on the metal washer but they may revolve together and in either case, centrifugal force tends to carry the oil outside onto the lifter rail where it may come in contact with the thread or the roving. Waste can also work in under the base or the washer and finally between the tube and the spindle, causing friction and sometimes stopping the revolutions.

As these tubes revolve from five thousand to six thousand revolutions per minute, if one stops or slows up from improper lubrication, the thread on that bobbin is slack and has less twist but the defect is hard to locate until it appears in the cloth. Uniform twist is very important.

To provide the absorbent washers with oil, the tube or the tube and the metal washer must be lifted and oil must be renewed daily. Moreover, unless the absorbent washer fits the spindle closely, the oil does not get evenly distributed on the spindle and as there is no way for the oil to get between the base and the metal washer, they tend to revolve together on the lifter rail and this tends to throw oil out on the lifter rail.

The purpose of my device is to provide a reservoir of oil which will store enough for a week and at the same time will prevent oil from getting out onto the stock or the yarn or either getting in between the tube and the spindle. In this reservoir are absorbent washers of such a character that as the lifter rail moves up and down, the spindle is uniformly lubricated and at the same time as the base of the tube and the whirl rests on and revolves with a hard metal washer which rests upon and revolves upon two or more inwardly projecting lugs, the bottom of this washer and the top of the lugs are thoroughly lubricated at all times so that the friction is greatly reduced.

Preferably, all the revolving parts are inside the wall of the reservoir so that the oil cannot be thrown out. Preferably the top edge of the wall of the reservoir slopes in, and is close to or is outside of the bottom flange of the whirl, thus tending to keep the oil in and the thread and stock out. The revolving flange and the driving, both close to the top edge of the reservoir, tend to throw outwardly any lint or loose thread or roving, thus keeping the inside of the reservoir entirely clear.

My whole device is simple and compact and the absorbent washers can easily be replaced, while the metal washer can be made of hard metal and can be easily and inexpensively replaced when worn. At the same time, there is little if any wear on the base of the tube and the tube, therefore, will last longer.

The construction also tends to alternately slightly squeeze and release the absorbent washers from pressure whereby the oil, while being evenly and thoroughly distributed where it belongs, is prevented from getting out onto the rails.

If there is a space between the top of the reservoir and the bottom flange of the whirl, the oiling can be done while the frame is in motion, although preferably it should be done when stopped, or if the wall is higher, the tube can be lifted and the oil introduced below the flange.

My device comprises a tubular reservoir which rests on the lifter rail outside the washer recess and having inwardly projecting lugs near but not at the top, there being the usual absorbent washer in the lifter rail recess and preferably two others of the same size below the lugs and also washer sections between the lugs extending up to the top of the lugs where there rests a metal washer preferably always in contact with the washer sections.

As a result of this construction, the movements of the tube up and down on the spindle tend to suck the oil into the reservoir and as there are three and a fraction absorbent washers instead of one, the frame needs to be oiled only once a week instead of once a day.

As there are three and a fraction absorbent oily washer surfaces in contact with the spindle instead of one, the spindle and tube are kept better oiled and the washer sections keep the bottom of the bearing washer and the top of the lugs well lubricated so that whether the tube and whirl revolve on the washer or revolve with it on the lugs, everything is thoroughly lubricated.

As the lugs and preferably the bearing washer are below the top of the reservoir, no oil can get out at the top and the roving or yarn cannot get inside the reservoir.

In the drawings,

Fig. 1 is an elevation partly in section of a spindle and part of a cap frame with the device in place.

Fig. 2 is a vertical section through the reservoir and rail.

Fig. 3 is a horizontal section looking down on the line 3, 3 of Fig. 2 with all the parts in place.

Fig. 4 is a view similar to Fig. 3 with the bearing washer removed.

Fig. 5 is a view from the bottom of the reservoir when removed from the rail.

Fig. 6 is a vertical section on a plane at right angles to the one shown in Fig. 2 with the reservoir and bearing washer removed from the spindle as on line 6, 6 of Fig. 4.

Fig. 7 is a view like Fig. 4 of a modification.

Figs. 8, 9 and 10 are details of various constructions of lugs.

Fig. 11 is a vertical section like Fig. 2 and Fig. 12 a horizontal section like Fig. 4 of a modification.

Figure 13:
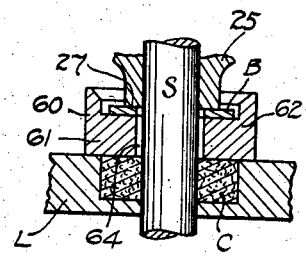
Fig. 13 is a vertical section like Fig. 2 and Fig. 14 a vertical section like Fig. 4 of another modification.

In Fig. 1 of the drawings, S represents a spindle carried by a rail A and carrying a tube T which includes the whirl 25 driven by a band 26 and having a base 27, the inside 28 of tube T being the same size as spindle S so that tube T can revolve smoothly on spindle S and can be raised and lowered with the package of yarn P which comprises a bobbin 80 on which yarn 81 is wound. The tube T is raised and lowered on spindle S by a lifter rail L through which is a spindle hole 18 around which is a recess 19.

The above parts as shown in Fig. 1 represent the type of spinning frame with which I prefer to use my oiling device, although it might be used with other types of spindles.

The device as shown in Figs. 1 to 6, consists of a tubular reservoir R near the top of which the lugs 1 and 2 project inwardly. These lugs are a sufficient distance above the bottom 4 to allow two absorbent washers D and E to be below them and a sufficient distance from the top 3 so that a bearing washer B can rest upon them and still the base 27 of tube T which rests upon washer B will be below the top 3.

C represents the absorbent washer such as is now often used in position in the recess 19 in the lifter rail L. Reservoir R is of such a diameter that it will rest on the lifter rail L outside of recess 19 but so that, preferably, its inside and the washers D and E can be about the size of washer C in recess 19.

Resting on top of washers C, D and E are the two sections 11 and 12 of another absorbent washer F. The total thickness of the washers C, D, E and F is such that they will slightly extend above the tops of the lugs 1 and 2, which tops are preferably substantially round.

The bearing washer B and the top of the lugs 1 and 2 are, therefore, lubricated and the movement of the lifter rail L has a slight tendency to compress these washers when going up but to produce a vacuum when going down. This action causes the oil to spread along the spindle S evenly but any excess is taken care of by the successive vacuum and compression and any oil which might be thrown out at the bottom of the whirl 25 by centrifugal force is caught and held inside of and below the top 3 of reservoir R.

As shown in Fig. 7, I may use in connection with reservoir 30, three inwardly projecting lugs 31, 32 and 33 between which are the three sections 34, 35 and 36 of an absorbent washer.

Instead of making the bearing washer supporting lugs integral as are 1 and 2, I may, as shown in Figs. 8 and 9, use round plugs such as 42, each with a conical head 43, driven into a conical hole 41 in the side of a reservoir such as 40.

As shown in Fig. 10, lugs such as 46 can be spot welded as at 48 to the inside of an inside tubular reservoir 47.

If necessary, as shown in Fig. 6, the top 7 of the bearing washer such as B can be somewhat rough so that it will stick to base 27 but the bottom 8 should be hard, smooth and flat so that it will slide easily on the top of the lugs.

Instead of having two absorbent washers below the lugs, I may, as shown in Figs. 11 and 12, use a reservoir 50 with lugs 51 and 52 between which are sections 54 of an absorbent washer, there being only one absorbent washer 53 under the lugs. This washer 53 rests on the washer C in the recess in lifter rail L.

Figure 14:
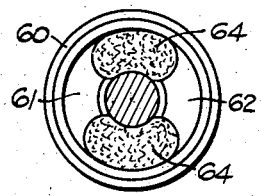

Moreover, as shown in Figs. 13 and 14, I can use a reservoir 60 with lugs 61 and 62, between which are the sections of an absorbent washer 64, on which the bearing washer B rests. The sections 64 rest directly upon the absorbent washer C in the recess in the lifter rail L. The lugs 61, 62 have wide bases, their sides are curved and the washer sections 64 are shaped to fit.

Figure 15:
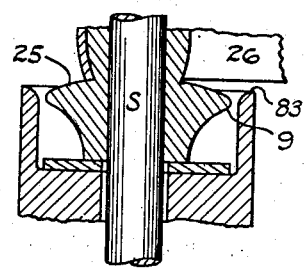
Figs. 15, 16 and 17 are vertical sections of other modifications.
Figure 16:
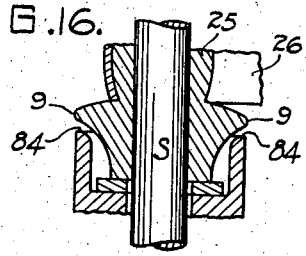

As shown in Fig. 2, the top 3 of the reservoir is closed to the bottom flange 9 of whirl 25, but as shown in Fig. 15, at 83 it may extend outside of it or as shown at 84 in Fig. 16 it may be below but close to it.

Figure 17:
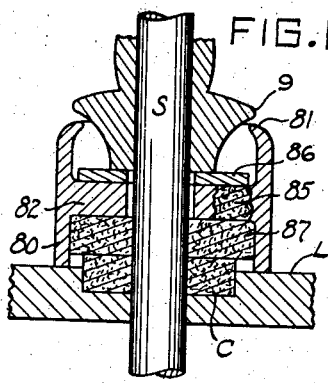

In Fig. 17 I show a reservoir 80 of which the top part 81 slopes in so as to be under and close to the bottom outside edge of whirl 9. This permits of the use of a larger absorbent washer 87 under lugs 82 and of larger washer sections 85 between the lugs and also of a larger bearing washer 86 resting on the lugs.

By making the top of my reservoir sloping inward, any oil which may be thrown out by the revolving whirl is caught and directed back into the reservoir while lint and especially any thread which might be caught by the lower flange of the whirl 9 slips over the outside face of the top instead of getting inside the reservoir.

To reduce the friction, I have shown the top surface of the lugs such as 2 and 42 as being a convex curved bearing face, but I can go beyond this and use revoluble bearing faces such as balls or rollers as shown in Figs. 18, 19, 20 and 21.

Figure 18:
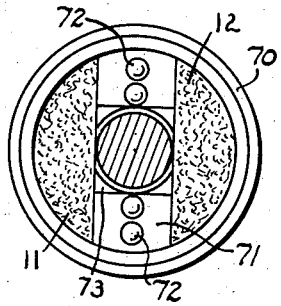
Fig. 18 is a horizontal section like Fig. 4
Figure 19:
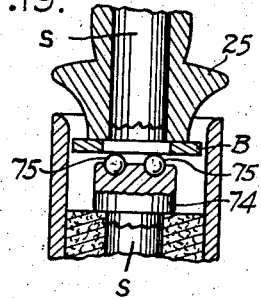
Fig. 19 is a vertical section like Fig. 2 of still another modification with the spindle broken to show the construction and no washer sections.

In Fig. 18, is shown a reservoir 70 with lugs such as 71 in each of which there are two sockets for balls 72, 72 which project at the top, washer sections 11 and 12 and washer 73, and in Fig. 19

I show a lug such as 74 in which are two rollers 75, 75 each in a suitable recess or socket.

Figure 20:
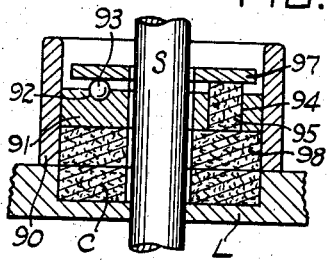
Fig. 20 is a vertical section like Fig. 2 and Fig. 21 a horizontal section like Fig. 4 of still another modification.
Figure 21:
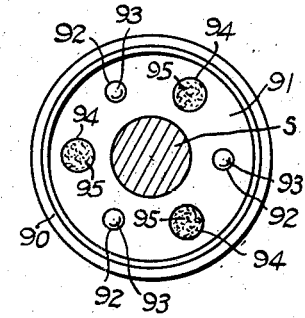

In Figs. 20 and 21 I show a reservoir 90 in which the lugs are blended together in the form of a disk 91 in the top of which are shown three sockets such as 92 each for a ball 93 which projects upward to serve as bearings for a bearing washer 97. There are also three holes 94 which extend through and in these are the cylindrical washer sections 95 which rest on an absorbent washer 98.

I claim:

1. A tubular oil reservoir for dead spindle spinning frames comprising a tubular reservoir having near the top a plurality of inwardly projecting bearing washer supporting lugs, each lug having a curved bearing face at the top; an absorbent washer in the reservoir under the lugs; a plurality of absorbent washer sections between and extending above the bearing washer supporting lugs; and a bearing washer which rests on the lugs and engages the washer sections.

2. A tubular oil reservoir for dead spindle spinning frames comprising a tubular reservoir having near the top a plurality of inwardly projecting bearing washer supporting lugs, each lug including a revoluble convex curved bearing face at the top; an absorbent washer in the reservoir under the lugs; a plurality of absorbent washer sections between the bearing washer supporting lugs; and a bearing washer which rests on the lugs and engages the washer sections.

3. A tubular oil reservoir having near the top a plurality of inwardly projecting bearing washer supporting lugs, each having a convex top surface; and a plurality of absorbent washer sections between the bearing washer supporting lugs; together with a bearing washer which is rough at the top and smooth at the bottom and which rests on the lugs and engages the washer sections.

GEORGE M. ARRAGG.